United States Patent Office.

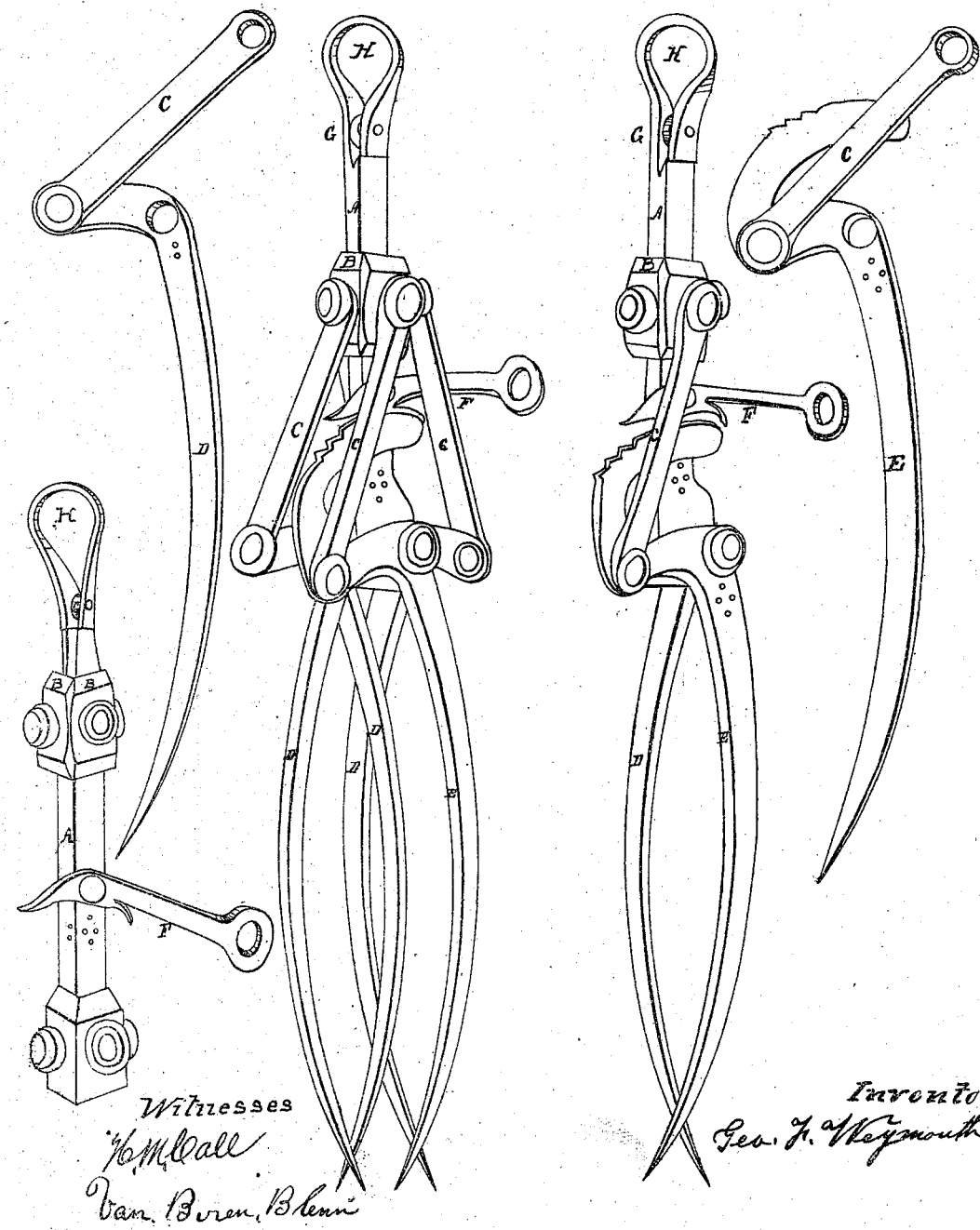

GEORGE F. WEYMOUTH, OF DRESDEN, MAINE.

Letters Patent No. 100,476, dated March 1, 1870; antedated February 26, 1870.

IMPROVEMENT IN HORSE HAY-FORKS.

The Schedule referred to in these Letters Patent and making part of the same

Be it known that I, GEORGE F. WEYMOUTH, of Dresden, in the county of Lincoln, and State of Maine, have invented a new and useful Machine for the Removal of Hay from the field, into a cart or rack, and also for the removal of said hay from said cart or rack to the place assigned to the same in the barn, or other place where hay is usually stored, and have called and do designate said machine as the Maine Hay-Fork; and I do hereby declare that the following is a full, clear, and exact description of the construction and operation of the same, reference being had to the annexed drawings making a part of this specification.

A is the main shaft, on which is a slide, B, inclosing said shaft, and moving upward and downward, to which are attached the movable arms C, by nut and screw.

To the lower part of the arms C are secured the tines D and E of the fork by means of a rivet, movable on the rivet. These tines, as will be seen by reference to the annexed drawing, are bent nearly at right angles, and at the angle are secured to the main shaft A at its lower part by nuts and screws, also movable.

The tine E differs from the tine D, inasmuch as at the attachment of the movable arm C it is bent upward in a circular shape, on the outward side of which are made notches to receive the end of the pawl F, which is secured to the main shaft A by a rivet, movable on the same.

At the outward end of the pawl F is a ring, to which can be attached a line, to be passed over the pulley G in the upper end of the main shaft A. By pulling upon this line the pawl F is raised, and the contents of the fork are dislodged.

At the upper end of the main shaft A is a ring, H, to receive the block and pawl by which the fork is sus-suspended.

The double or four-tined fork differs from the foregoing or single fork only that there are two additional tines, D, and secured to the slide B, arm C, and main shaft A, as in the single fork, and can be removed at pleasure, making again the single fork.

In the operation of both the single and double fork, it is suspended by the ring H to the block and pawl, and when used it is plunged downward into the hay, at the same time the tines open in opposite directions outward, by the slide B moving upward. The hay is then prevented from slipping from the fork by the pawl F, which secures the load until pulled upon by the line passing over the pulley G, and attached to the outward end of the pawl F, when it is at once discharged by its own weight.

What I claim as my invention, and desire to secure by Letters Patent, is—

A horse hay-fork, having shaft A, slide B, and movable arm C, constructed and arranged as specified, for the purpose of working the tines D and E, by the aid of pawl F, pulley G, and ring H, arranged as specified.

In testimony that I claim the above, I have hereunto subscribed my name in the presence of two witnesses, this 26th day of June, A. D. 1869.

GEO. F. WEYMOUTH.

Witnesses:
 J. W. SPAULDING,
 W. R. THUBALD.